April 1, 1924.

R. ELLIS

SEPARATING PROCESS

Original Filed Sept. 17, 1915

1,488,745

Witnesses:

Inventor
Ridsdale Ellis

Patented Apr. 1, 1924.

1,488,745

UNITED STATES PATENT OFFICE.

RIDSDALE ELLIS, OF OAK PARK, ILLINOIS, ASSIGNOR, BY DIRECT AND MESNE ASSIGNMENTS, TO ELLIS FLOTATION COMPANY, INC., OF NEW YORK, N. Y., A CORPORATION OF NEW YORK.

SEPARATING PROCESS.

Application filed September 17, 1915, Serial No. 51,210. Renewed November 29, 1922.

*To all whom it may concern:*

Be it known that I, RIDSDALE ELLIS, a citizen of the United States, and a resident of Oak Park, in the county of Cook and State of Illinois, have invented certain new and useful Improvements in Separating Processes, of which the following is a specification.

My invention relates to processes for concentrating parts of masses of composite character, such as metalliferous ores, by treating the comminuted mass with a gaseous fluid adapted to aid in the movement of certain of the comminuted particles relatively to others having different qualities.

More particularly my invention relates to processes for concentrating metalliferous ores by means of the preferential affinity of gaseous bubbles for the metalliferous particles, which causes the adhesion of such particles to the bubbles and thereby enables the latter to lift and thereby separate such particles from the other constituents of the ore.

The principal objects of my invention are in general to enhance the efficiency of such separating processes as hitherto carried out, more particularly by means of gases having certain characteristics, and generally to improve the separation of comminuted materials by flotation or similar means.

According to the preferred steps of my improved process, I mix the comminuted material with water, generate in or otherwise introduce a readily condensable and preferably soluble gas into the ore pulp and then introduce air mechanically, either by injection through a fine orifice or by agitation, into the mixture to form a froth which is collected in any suitable way.

The readily condensable gas employed may be of very diverse character, although the physical and other properties of various gases make certain of them particularly suitable for the purpose.

I prefer to use air with additions of such gases as readily condense at an interface. As a general rule, the readiness with which a gas will condense upon at an interface depends on the ease with which the gas may be liquefied. For instance carbon dioxide condenses to a greater extent on a sulphide surface than does air for the reason that the critical temperature of the carbon dioxide is $+31°$ C., whereas that of oxygen and nitrogen are, respectively, $-118°$ C. $-146°$ C.

If the gas is soluble it may be dissolved in the water and brought out of solution in various ways, such as a reduction of the pressure on the liquid or a reduction of the partial pressure of the dissolved gases by using an atmosphere of different gas or gases. If, therefore, a readily condensable gas is dissolved in the ore pulp it may be partially liberated from solution by the introduction of air bubbles into the pulp and consequently absorbed at various gas-solid and gas-liquid interfaces and thereby aid in the separation of the values from the remainder of the ore.

The readily condensable gas employed may conveniently be carbon dioxide as it is very cheaply generated either in the pulp or externally thereof, is readily condensable, is fairly readily soluble so that it is adapted for partial pressure reduction processes and being the anhydride of an acid gives the pulp a slightly acid reaction. It also possesses a strong natural affinity for metalliferous particles.

In practice carried out by me with a cupriferous pyrite ore which contained about 42% of sulphide of iron and copper in a gauge of quartz and slate agitation in an atmosphere of carbon dioxide alone under certain conditions better results were obtained than with air alone. However, superior results to those attained with either air alone or carbon dioxide alone were secured by saturating the liquid with carbon dioxide prior to agitation and then agitating in an atmosphere of air.

It was further found that there is considerable frictional electricity generated where mechanical agitation is employed to introduce air into the pulp and that the efficiency of separation may be increased by electrically grounding the agitation cell and thereby allowing such electricity to flow away.

In addition to using certain gases or mixtures of gases I also prefer to carry out the flotation separation in the presence of a solution containing polyvalent anions and also in some cases polyvalent cations for further increasing the affinity of the gaseous fluids for the metalliferous particles.

I have found that in general the action of electrolytes is most advantageous when the valence of the anions produced by the solution of such electrolytes is highest, salts of tri-basic acids being in general superior to salts of di-basic acids, and salts of quadri-basic acids being superior to salts of tri-basic acids, and so on.

I have further found that when no oil is used the best results are generally obtained by using a neutral or alkaline solution of a salt adapted to give an anion having a relatively high valence in conjunction with a monovalent cation. On the other hand, when oil is used it is found, under some circumstances, that the best results of all are obtained when a neutral or acid solution of an electrolyte is used which is capable of giving cations and anions, both of which are of high valence.

As examples of suitable electrolytes of the first type sodium orthophosphate, $Na_3PO_4$, sodium pyrophosphate, $Na_4P_2O_7$, and sodium tetraphosphate or tetrametaphosphate, $Na_6P_4O_{13}$, may be given.

The results of pyrophosphoric acid appear to yield more quadrivalent anions than orthophosphates do trivalent anions. Consequently I prefer to employ pyrophosphates as they give a greater number of higher valent anions than do orthophosphates.

Similarly sodium pyrophosphate is superior under certain circumstances to sodium tetraphosphate or tetrametaphosphate although the latter is capable of giving a hexavalent anion, probably on account of the much lower dissociation of the latter as compared with the former.

As examples of suitable electrolytes of the second type aluminum or titanium pyrophosphate may be given.

It is well known to those skilled in the art that the exact proportions of those substances which may be used in such processes vary somewhat according to the nature of the particular ore treated; therefore, I give, for purposes of illustration, the results of actual practice with the above referred to cupriferous pyrite ore.

With this ore good results were obtained without oil using a solution containing 0.10% (on the ore) of sodium pyrophosphate or 0.16% of sodium pyrophosphate.

Using oil good results were obtained using a solution containing 0.016% sodium pyrophosphate of 0.01% titanium pyrophosphate and 0.1% of sulphuric acid.

Various forms of apparatus may be employed for carrying out the separation of metalliferous matter by flotation. One form of apparatus which is suitable for carrying out my process is illustrated in the accompanying drawings, in which:—

Figure 1:
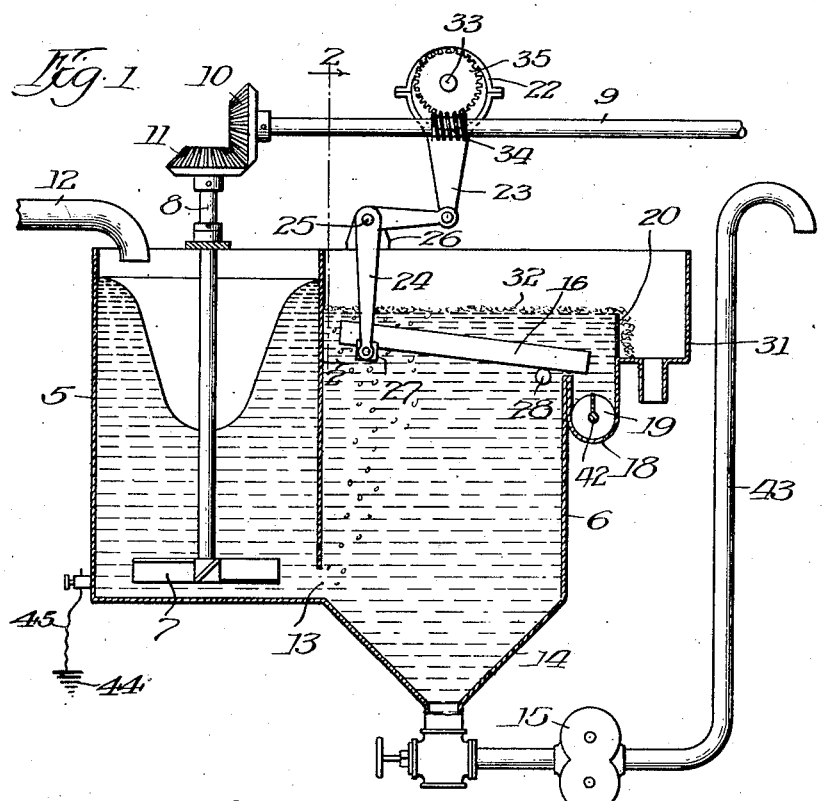
Figure 1 is a vertical section through the apparatus as a whole.
Figure 2:
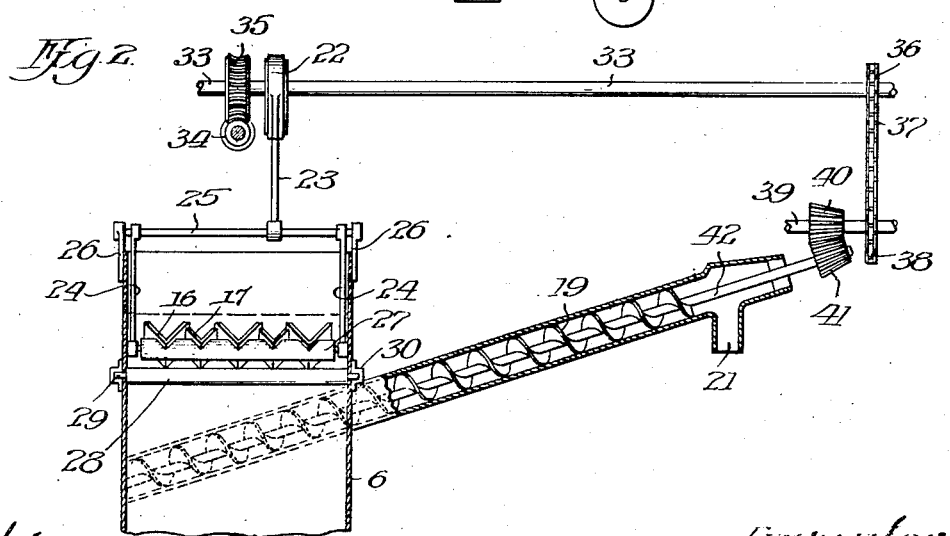
Figure 2 is a section on the line 2—2 of Figure 1.

The apparatus comprises an agitation chamber 5, and a spitzkasten 6. In the agitation chamber 5 an agitator 7 is provided, mounted at the lower end of a shaft 8, rotated by means of a shaft 9, connected thereto by means of bevel gears 10 and 11. Ore pulp containing the desired gas, such as carbon dioxide, in solution, is fed into the agitation chamber through the pipe 12, and escapes from the same chamber through the aperture 13 at its lower edge. As a result of the agitation in the chamber 5, the material which passes through the aperture 13 into the spitzkasten 6, includes particles of metalliferous matter adhering to bubbles of air which "raft" them to the surface in the spitzkasten to form a layer of froth 32 at the top of the water. The agitation chamber is connected to the ground 44 by means of a suitable connection 45.

The tails, consisting of silica, silicates, etc., sink to the bottom of the spitzkasten and collect in the hopper shaped part 14, from which they may be transferred by means of a rotary pump 15 and pipe 43 to a second agitation chamber for further treatment. Only one agitation chamber and spitzkasten are shown, although it is usual to provide a series of such chambers not only for successively treating the tails but also for refloating the values in order to clean them.

The froth flows over an overflow lip 20 into the launder 31.

The adhesion between the bubbles of air and the metalliferous particles is not particularly strong in some cases, particularly when no organic frothing agent is used, so that there is a tendency for the bubbles to break when they reach the surface of the water and thereby drop the metalliferous particles which had been attached to them. Accordingly, I have provided means for collecting the metalliferous particles which may be dropped from the surface of the water without interfering with the upward movement of bubbles of air carrying metalliferous particles. Conveniently these means may comprise a number of V-shaped troughs 16 and 17. The troughs 16 are arranged with their edges overlying the edges of the trough 17, so that substantially all particles which fall from the surface by the breaking of air bubbles will be caught by one or other of the troughs 16 or 17. On the other hand a space is provided between the edges of the troughs 16 and 17, through which the bubbles of air carrying metalliferous particles can pass on their upward way to the layer of froth.

The provision of troughs 16 and 17 below the surface of the water is not in itself sufficient, as these troughs would soon be filled with metalliferous matter which would then overflow through the spaces between the troughs. Accordingly, I provide means for moving the material which collects in the troughs toward one end of the latter and then into a side chamber 18.

For moving the material to one end of the troughs and discharging it therefrom I incline the troughs and also give them a vibratory to and fro movement so as to shake the material along towards and out of the lower ends. For producing this longitudinal movement of the troughs, I provide an eccentric 22 on a shaft 33, driven from the shaft 9 by means of worm gears 34 and 35. The eccentric 22 is connected by means of a rod 23 to a bell-crank arrangement 24, pivoted at 25 to brackets 26, arranged on each side of the spitzkasten, and connected at its lower end to a cross-member, connected to and carrying one end of each of the troughs 16 and 17. The other ends of the troughs are supported by a roller 28, journalled in bearings 29 and 30, arranged in the walls of the apparatus.

The metalliferous matter deposited in the side chamber 18 is at a lower level than the overflow lip 20 and consequently I have provided means for raising it to a height equal to or greater than that of the overflow lip so that such metalliferous matter can be readily discharged separately from the water. I have provided, therefore, an inclined worm conveyor 19 in the side chamber 18. This worm conveyor raises the metalliferous matter to a discharge orifice 21, whose upper edge is at substantially the same height or higher than the overflow lip 20.

This conveyor may be driven by means of a sprocket 36 on the shaft 33, connected by a claim 37 to a sprocket 38 on an intermediate shaft 39. The shaft 39 has a bevel gear 40, mounted thereon in mesh with a bevel gear 41 on the shaft 42 of the worm conveyor.

Although in the preferred form of my process, as above described, the soluble readily condensable gas is introduced whilst the comminuted ore or other material is suspended in water. The dry comminuted material may, in certain cases, be treated with the readily condensable gas prior to its insertion in the water so that the gas is absorbed on the surface of the dry particles.

While I have referred to the employment of oil as a frothing agent, I may use a soluble organic frothing agent, such as amyl alcohol.

Finally, I may in some cases employ heat for aiding in the separation of the metalliferous constituents by means of the gaseous fluid employed.

Having thus described my invention and illustrated its use, what I claim is new and desire to secure by Letters Patent is:—

1. The process of concentrating composite comminuted masses of composite character which includes mixing the mass with water, introducing a readily condensable gas comprising the anhydride of an oxy-acid into the mixture, introducing air into the mixture, and separating the particles of the mass having a preferential affinity for air from the remainder of the mass by flotation.

2. The process of concentrating composite comminuted masses of composite character which includes mixing the mass with water, introducing a readily condensable gas having a critical temperature above 25° C., comprising the anhydride of an oxy-acid into the mixture, introducing air into the mixture, and separating the particles of the mass having a preferential affinity for air from the remainder of the mass by flotation.

3. The process of concentrating ores which includes mixing the comminuted ore with water to form a pulp, aerating the pulp with bubbles of gas containing carbon dioxide and free oxygen, the percentage of oxygen both free and combined being greater than that of the atmosphere, to form a froth and separating the froth from the remainder by flotation.

4. The process of concentrating composite masses of composite character which includes mixing the mass with water to form a pulp, introducing carbon dioxide and air into the pulp and separating the particles of the mass having a preferential affinity for air from the remainder of the mass by flotation.

5. The process of concentrating ores which includes mixing the comminuted ore with water to form a pulp, generating minute bubbles of gas on the surface of the mineral particles in the pulp by reducing substantially the effective solubility of gases in solution in the water, aerating the pulp with bubbles of gas having a different composition to aid the first mentioned bubbles to form a froth with such particles, the gas forming the froth including in its composition carbon dioxide, and separating the mineral carried by the froth from the remainder of the ore.

In testimony whereof I have hereunto signed my name in the presence of the two subscribing witnesses.

RIDSDALE ELLIS.

Witnesses:
PAUL CARPENTER,
DONALD C. WILLIAMS.